United States Patent
Shang et al.

(10) Patent No.: US 12,314,677 B2
(45) Date of Patent: May 27, 2025

(54) METHOD FOR PRE-TRAINING MODEL, DEVICE, AND STORAGE MEDIUM

(71) Applicant: BEIJING BAIDU NETCOM SCIENCE TECHNOLOGY CO., LTD., Beijing (CN)

(72) Inventors: Junyuan Shang, Beijing (CN); Shuohuan Wang, Beijing (CN); Siyu Ding, Beijing (CN); Yanbin Zhao, Beijing (CN); Chao Pang, Beijing (CN); Yu Sun, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 288 days.

(21) Appl. No.: 17/889,218

(22) Filed: Aug. 16, 2022

(65) Prior Publication Data

US 2023/0040095 A1    Feb. 9, 2023

(30) Foreign Application Priority Data

Oct. 28, 2021   (CN) .......................... 202111260446.4

(51) Int. Cl.
*G06F 40/40*    (2020.01)
*G06F 40/289*   (2020.01)

(52) U.S. Cl.
CPC ............ *G06F 40/40* (2020.01); *G06F 40/289* (2020.01)

(58) Field of Classification Search
CPC ................................ G06F 40/40; G06F 40/289
See application file for complete search history.

(56) References Cited

U.S. PATENT DOCUMENTS

2018/0239815 A1*   8/2018   Yi ......................... G06V 10/75

FOREIGN PATENT DOCUMENTS

| | | |
|---|---|---|
| CN | 110263158 A | 9/2019 |
| CN | 112183091 A | 1/2021 |
| CN | 113127624 A | 7/2021 |
| CN | 113468877 A | 10/2021 |
| CN | 113962315 A | 1/2022 |
| JP | 2003-263441 A | 9/2003 |
| JP | 2015-170241 A | 9/2015 |
| JP | 2016-091078 A | 5/2016 |
| WO | WO 2018/126213 A1 | 7/2018 |

OTHER PUBLICATIONS

Aghajanyan, A., Okhonko, D., Lewis, M., Joshi, M., Xu, H., Ghosh, G., & Zettlemoyer, L. (2021). Htlm: Hyper-text pre-training and prompting of language models. arXiv preprint arXiv:2107.06955. (Year: 2021).*

(Continued)

*Primary Examiner* — Ibrahim Siddo
(74) *Attorney, Agent, or Firm* — Cozen O'Connor

(57) ABSTRACT

A method and apparatus for pre-training a model, a device, a storage medium, and a program product. An embodiment of the method includes: acquiring a sample natural language text; generating N types of prompt words based on the sample natural language text, where N is a positive integer; generating sample input data based on the sample natural language text and the N types of prompt words; and training an initial language model based on the sample input data, to obtain a pre-trained language model.

20 Claims, 5 Drawing Sheets

(56) References Cited

OTHER PUBLICATIONS

Fan et al., "Controllable Abstractive Summarization", Facebook AI Research, May 18, 2018, 10 pages.
He et al., "CTRLsum: Towards Generic Controllable Text Summarization", Dec. 8, 2020, 35 pages.
Liu et al., "Pre-train, Prompt, and Predict: A Systematic Survey of Prompting Methods in Natural Language Processing", Jul. 28, 2021, 46 pages.
Wang et al., "ERNIE 3.0 Titan: Exploring Larger-scale Knowledge Enhanced Pre-training for Language Understanding and Generation", Dec. 23, 2023, 28 pages.

* cited by examiner

METHOD FOR PRE-TRAINING MODEL, DEVICE, AND STORAGE MEDIUM

CROSS-REFERENCE TO RELATED APPLICATIONS

This application claims priority to Chinese Patent Application No. 202111260446.4, filed with the China National Intellectual Property Administration (CNIPA) on Oct. 28, 2021, the content of which is incorporated herein by reference in its entirety.

TECHNICAL FIELD

The present disclosure relates to the technical field of artificial intelligence, in particular to the technical field of natural language processing and deep learning.

BACKGROUND

In recent years, with the continuous development of natural language processing technology, language models gradually fade in people's field of vision. Language models play an important role in natural language processing. The task of a language model is to predict the probability of a sentence appearing in a language. Although large-scale language models exhibit strong text generation capabilities, it is difficult for users to manipulate generation results of the language models.

SUMMARY

Embodiments of the present disclosure propose a method and apparatus for pre-training a model, a device, a storage medium, and a program product.

In a first aspect, some embodiments of the present disclosure provide a method for pre-training a model. The method includes: acquiring a sample natural language text; generating N types of prompt words based on the sample natural language text, wherein N is a positive integer; generating sample input data based on the sample natural language text and the N types of prompt words; and training an initial language model based on the sample input data, to obtain a pre-trained language model.

In a second aspect, some embodiments of the present disclosure provide a method for generating text. The method includes: acquiring a prefix text fragment and at least one type of prompt word; splicing the prefix text fragment with the at least one type of prompt word to generate input data; and inputting the input data into a pre-trained language model to generate pseudo-natural language text, wherein the pre-trained language model is obtained by training using the method according to the first aspect.

In a third aspect, some embodiments of the present disclosure provide an electronic device. The electronic device includes: at least one processor; and a memory communicatively connected to the at least one processor; where the memory stores instructions executable by the at least one processor, and the instructions, when executed by the at least one processor, cause the at least one processor to perform the method according to any one of the implementations of the first aspect or to perform the method according to any one of the implementation of the second aspect.

In a fourth aspect, some embodiments of the present disclosure provide a non-transitory computer readable storage medium, storing computer instructions thereon, wherein, the computer instructions, when executed by a computer, cause the computer to perform the method according to any one of the implementations of the first aspect or to perform the method according to any one of the implementation of the second aspect.

It should be understood that contents described in this section are neither intended to identify key or important features of embodiments of the present disclosure, nor intended to limit the scope of the present disclosure. Other features of the present disclosure will become readily understood in conjunction with the following description.

BRIEF DESCRIPTION OF THE DRAWINGS

After reading detailed descriptions of non-limiting embodiments with reference to the following accompanying drawings, other features, objectives, and advantages of the present disclosure will become more apparent. The accompanying drawings are used for better understanding of the present solution, and do not constitute a limitation to the present disclosure. In which.

DETAILED DESCRIPTION OF EMBODIMENTS

Example embodiments of the present disclosure are described below with reference to the accompanying drawings, where various details of the embodiments of the present disclosure are included to facilitate understanding, and should be considered merely as examples. Therefore, those of ordinary skills in the art should realize that various changes and modifications can be made to the embodiments described here without departing from the scope of the present disclosure. Similarly, for clearness and conciseness, descriptions of well-known functions and structures are omitted in the following description.

It should be noted that embodiments of the present disclosure and features in the embodiments may be combined with each other on a non-conflict basis. The present disclosure will be described in detail below with reference to the accompanying drawings and in conjunction with the embodiments.

Figure 1:
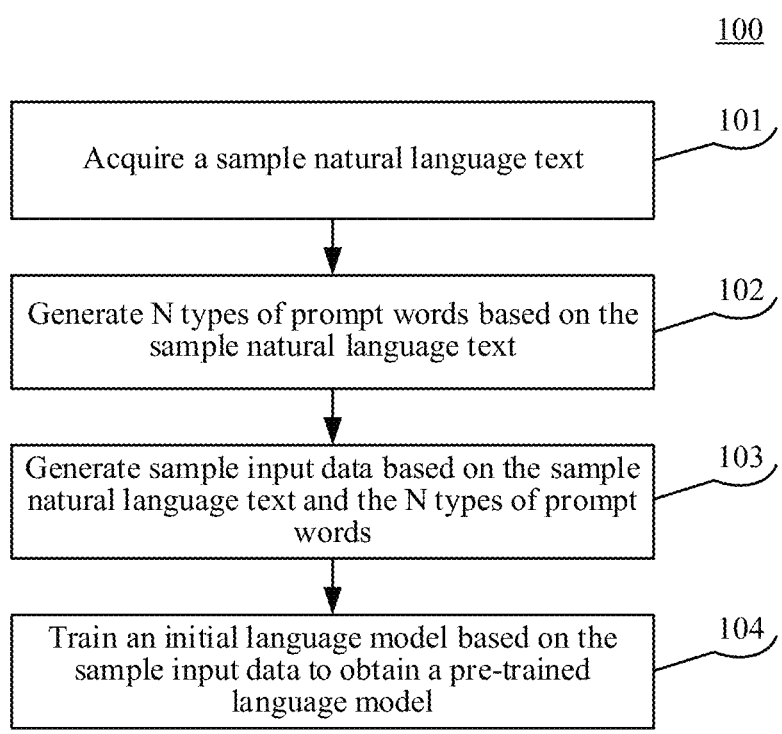
FIG. 1 is a flowchart of a method for pre-training a model according to an embodiment of the present disclosure.

FIG. 1 shows a flow 100 of a method for pre-training a model according to an embodiment of the present disclosure. The method for pre-training a model includes the following steps:

Step 101, acquiring a sample natural language text.

In the present embodiment, an executing body of the method for pre-training a model may acquire the sample natural language text.

The sample natural language text may be derived from a corpus for pre-training. Typically, these texts are of high quality, with appropriate wording, coherence, and concise language. For example, based on the knowledge-enhanced ERNIE (Enhanced Representation through Knowledge Integration) 3.0 10-billion-parameter large model, a corpus for pre-training of up to 4 TB is built. The corpus for pre-training has a wide variety of sources, including encyclopedia, search, novels, baidu, couplets, ancient poems and other various data. The sample natural language text may be derived from the corpus for pre-training.

Step 102, generating N types of prompt words based on the sample natural language text.

In the present embodiment, the executing body may generate the N types of prompt words based on the sample natural language text. N is a positive integer.

Typically, by analyzing content of the sample natural language text, N types of prompt words may be determined. The N types may include, but are not limited to, a task type, a topic type, a key phrase type, a sentiment type, a generated length type, or the like.

Task types may be further classified into a plurality of kinds such as Q&A, knowledge, dialogue, general, financial, medical, legal, couplets, poetry, songs, translation, mathematics, web pages, Baidu Tieba, etc. Each kind of task type may be associated with a vocabulary of consecutive prompt words. First, the kind of task type to which the sample natural language text belongs may be determined, then consecutive prompt words may be acquired from the vocabulary of consecutive prompt words associated with the kind of task type as prompt words of the task type of the sample natural language text. The consecutive prompt words may be special characters, and each special character may be a learnable parameter. Compared with discrete prompt words, consecutive prompt words have stronger generality and enable the model to learn more effective representations.

The topic type may correspond to a topic type prompt word list. The topic type prompt word list may include, but is not limited to international, sports, entertainment, society, finance, current affairs, science and technology, science, data, sentiment, automobile, education, fashion, games, military, travel, food, culture, health and wellness, funny, home, comics and animation, pets, parenting, horoscope, history, music, and other prompts. A prompt word of the topic type of the sample natural language text may be selected from the topic type prompt word list. With the topic-type prompt word, the model may be guided to generate topic-related text.

Typically, prompt words of the key phrase type are words that people pay more attention to in natural language texts, for example, keywords such as person, time, place, and event. A keyword of the type of person, time, place, event, etc. extracted from the sample natural language text may be used as a prompt word of the key phrase type of the sample natural language text. With prompting of these keywords, the model may generate keyword-related text.

Prompt words of the sentiment type may include negative, positive, and neutral. Sentiment classification of the sample natural language text may determine a sentiment category of the sample natural language text, and the sentiment category is a prompt word of the sentiment type. With the sentiment-type prompt word, the model may be guided to generate sentiment-related text.

A prompt word of the generated length type of the sample natural language text may be a length of the sample natural language text. The addition of the generated length prompt word may control a length of generated text and avoid a semantic incoherence problem caused by artificially pre-truncating too long content generated expected of the model.

Step 103, generating sample input data based on the sample natural language text and the N types of prompt words.

In the present embodiment, the executing body may generate the sample input data based on the sample natural language text and the N types of prompt words.

Typically, a sample prefix text fragment is intercepted from the sample natural language text, and all of or some of the N types of prompt words are inserted in front of the sample prefix text fragment, so as to generate the sample input data. For example, a sample prefix text fragment is composed by first 5 words intercepted from the sample natural language text, and all the N types of prompt words are inserted in front of the sample prefix text fragment to obtain the sample input data. In special cases, the prefix text fragment may be empty. For example, some types of prompt words are selected from the N types of prompt words, and the sample input data is obtained by direct splicing the selected prompt words.

Step 104, training an initial language model based on the sample input data, to obtain a pre-trained language model.

In the present embodiment, the executing body may train the initial language model based on the sample input data to obtain the pre-trained language model.

Typically, inputting the sample input data into the initial language model may obtain sample pseudo-natural language text. Based on a difference between the sample pseudo-natural language text and the sample natural language text, parameters of the initial language model may be adjusted, so that a distribution of the sample pseudo-natural language text output by the model is closer to the input sample natural language text. The closer the distribution of the sample pseudo-natural language text is to the sample natural language text, the higher the quality of the sample pseudo-natural language text, and the better the performance of the pre-trained language model.

The pre-trained language model may be obtained by training the initial language model using machine learning methods and the sample input data. Typically, the parameters (e.g., a weight parameter and a bias parameter) of the initial language model may be initialized using some different small random numbers. "Small random number" is used to ensure that the model may not enter a saturated state due to too large weights which may result in training failure, and "different" is used to ensure that the model may learn normally. The parameters of the initial language model may be continuously adjusted during the training, until a pre-trained language model which generates pseudo-text whose distribution is closer to the distribution of the input real text is generated through the training. For example, BP (Back Propagation) algorithm or SGD (Stochastic Gradient Descent) algorithm may be used to adjust the parameters of the initial language model.

The method for pre-training a model provided by embodiments of the present disclosure, provides a controllable generation pre-training technology based on prompt words. By designing prompt word templates for different types of data in the pre-training phase, a language model can better generate text, which increases the controllability, interpretability and fun of the model. In addition, the language model is trained by building controllable generated data based on prompt words, which avoids subsequent training for downstream generation tasks and reduces training costs.

Figure 2:
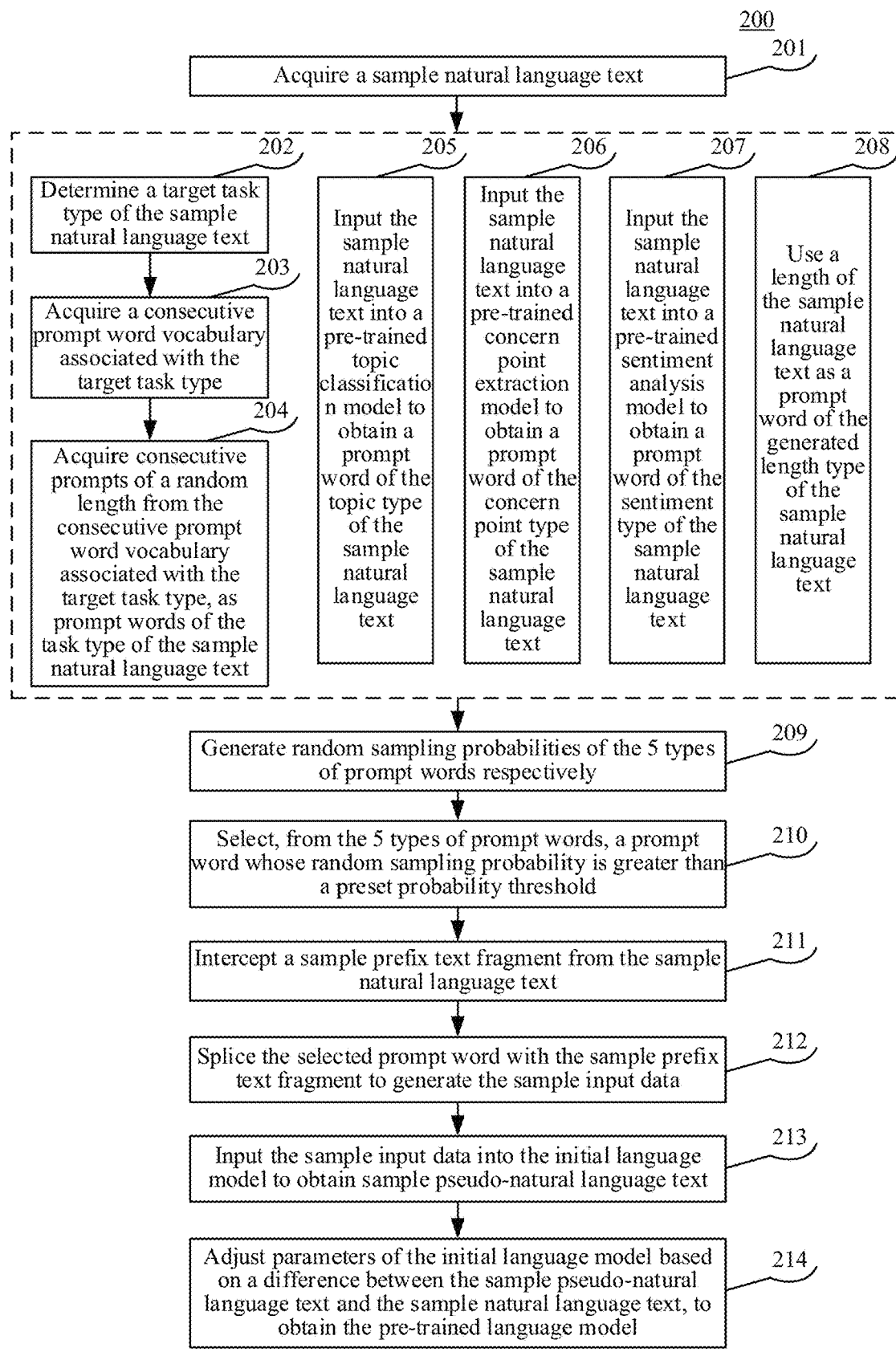
FIG. 2 is a flowchart of the method for pre-training a model according to another embodiment of the present disclosure.

With further reference to FIG. 2, illustrating a flow 200 of the method for pre-training a model according to another embodiment of the present disclosure. The method for pre-training a model includes the following steps:

Step 201, acquiring a sample natural language text.

In the present embodiment, the operation of step 201 has been described in detail in step 101 in the embodiment shown in FIG. 1, and detailed description thereof will be omitted.

In the present embodiment, a prompt word type may include a task type, a topic type, a key phrase type, a sentiment type, and a generated length type. The executing body of the method for pre-training a model may execute steps 202-204, 205, 206, 207 and 208 in parallel to acquire the above five types of prompt words of the sample natural language text.

Step 202, determining a target task type of the sample natural language text.

In the present embodiment, the executing body may analyze the sample natural language text to determine the kind of task type to which the sample natural language text belongs, that is, the target task type.

Task types may be further classified into a plurality of kinds such as Q&A, knowledge, dialogue, general, financial, medical, legal, couplets, poetry, songs, translation, mathematics, web pages, Baidu Tieba, etc.

Step 203, acquiring a vocabulary of consecutive prompt words associated with the target task type.

In the present embodiment, the executing body may acquire the vocabulary of consecutive prompt words associated with the target task type.

Typically, each kind of task type may be associated with one vocabulary of consecutive prompt words. After determining the target task type of the sample natural language text, the vocabulary of consecutive prompt words associated with the target task type may be acquired.

Step 204, acquiring consecutive prompt words of a random length from the vocabulary of consecutive prompt words associated with the target task type, as prompt words of the task type of the sample natural language text.

In the present embodiment, the executing body may acquire the consecutive prompt words of a random length from the vocabulary of consecutive prompt words associated with the target task type, as the prompt words of the task type of the sample natural language text.

Typically, consecutive prompt words may be acquired from the vocabulary of consecutive prompt words associated with the target task type, as the prompt words of the task type of the sample natural language text. The consecutive prompt words may be special characters, and each special character may be a learnable parameter. Compared with discrete prompt words, consecutive prompt words have stronger generality and enable the model to learn more effective representations. For example, the vocabulary of consecutive prompt words associated with the general task type may include consecutive prompt words <General 0> to <General 63>. Consecutive prompt words <General 0> to <General M> may be acquired from the vocabulary of consecutive prompt words associated with the general task type, and the acquired consecutive prompt words <General 0> to <General M> are used as the prompt words of the task type of the sample natural language text. Here, M is an integer number between 0-63. In the training phase, M is obtained through randomly sampling. While in a prediction phase, the larger the value of M is selected, the stronger a guiding signal of the task is expressed.

Step 205, inputting the sample natural language text into a pre-trained topic classification model to obtain a prompt word of the topic type of the sample natural language text.

In the present embodiment, the executing body may input the sample natural language text into the pre-trained topic classification model to obtain the prompt word of the topic type of the sample natural language text.

The topic type may correspond to a topic-type prompt word list. The topic-type prompt word list may include, but is not limited to international, sports, entertainment, society, finance, current affairs, science and technology, science, data, sentiment, automobile, education, fashion, games, military, travel, food, culture, health and wellness, funny, home, comics and animation, pets, parenting, horoscope, history, music, and other prompts. With the topic-type prompt word, the model may be guided to generate topic-related text.

The topic classification model may be neural networks obtained by training using machine learning methods. Typically, the topic classification model may be an existing model, and an API (Application Programming Interface) is provided externally. The executing body may use the topic classification model by calling the API to acquire the prompt word of the topic type of the sample natural language text.

Step 206, inputting the sample natural language text into a pre-trained key phrase extraction model to obtain a prompt word of the key phrase type of the sample natural language text.

In the present embodiment, the executing body may input the sample natural language text into the pre-trained key phrase extraction model to obtain the prompt word of the key phrase type of the sample natural language text.

Typically, prompt words of the key phrase type are words that people pay more attention to in natural language texts, for example, keywords such as person, time, place, and event. A keyword of the type of person, time, place, event, etc. extracted from the sample natural language text may be used as the prompt word of the key phrase type of the sample natural language text. With prompting of these keywords, the model may generate keyword-related text.

The key phrase extraction model may be neural networks obtained by training using machine learning methods. Typically, the key phrase extraction model may be an existing model, and an API is provided externally. The executing body may use the key phrase extraction model by calling the API to acquire the prompt of the key phrase type of the sample natural language text.

Step 207, inputting the sample natural language text into a pre-trained sentiment analysis model to obtain a prompt word of the sentiment type of the sample natural language text.

In the present embodiment, the executing body may input the sample natural language text into the pre-trained sentiment analysis model to obtain the prompt word of the sentiment type of the sample natural language text.

Prompt words of the sentiment type may include negative, positive, and neutral. Sentiment classification of the sample natural language text may determine a sentiment category of the sample natural language text, and the sentiment category is used as the prompt word of the sentiment type. With the sentiment-type prompt word, the model may be guided to generate sentiment-related text.

The sentiment analysis model may be neural networks obtained by training using machine learning methods. The sample natural language text may be classified as negative, positive and neutral. Typically, the sentiment analysis model may be an existing model, and an API is provided externally. The executing body may use the sentiment analysis model by calling the API to acquire the prompt word of the sentiment type of the sample natural language text.

Step 208, using a length of the sample natural language text as a prompt word of the generated length type of the sample natural language text.

In the present embodiment, the executing body may use the length of the sample natural language text as the prompt word of the generated length type of the sample natural language text.

The prompt word of the generated length type of the sample natural language text may be the length of the sample natural language text. The addition of the generated length prompt word may control a length of generated text and avoid a semantic incoherence problem caused by artificially pre-truncating too long content generated expected of the model.

Here, 5 types of prompt words are built, including the task type, the topic type, the key phrase type, the sentiment type and the generated length type, which may enable the model to better complete text generation for specified tasks, topics, styles, etc., greatly enriching users' control over text generation.

Step 209, generating random sampling probabilities of 5 types of prompt words respectively.

In the present embodiment, the executing body may generate the random sampling probabilities of the 5 types of prompt words respectively. In the training phase, the random sampling probabilities of the 5 types of prompt words may be randomly generated.

Step 210, selecting, from the 5 types of prompt words, a prompt word whose random sampling probability is greater than a preset probability threshold.

In the present embodiment, the executing body may select, from the 5 types of prompt words, the prompt word whose random sampling probability is greater than the preset probability threshold.

Typically, in the training phase, a prompt word of a type is only used when its random sampling probability is greater than the preset probability threshold (e.g., 0.5). Random sampling decides whether to use a prompt word of a certain type, avoiding strong dependence of the model on the prompt word during text generation. In the prediction phase, a user may choose whether to use a certain type of prompt word in more variety.

Typically, in the training phase, an optimization objective may be generated using controllable conditions, such as:

$$\mathcal{L} = -\log P(x_i | x_{<i}, 1_{P_{task}>0.5}\text{task}, 1_{P_{topic}>0.5}\text{topic}, 1_{P_{keyphrase}>0.5}\text{keyphrase}, 1_{P_{sentiment}>0.5}\text{sentiment}, 1_{P_{words}>0.5}\text{words})$$

here, $1_{P_*>0.5}$ is an indicator function, $1_{P_{task}>0.5}$, $1_{P_{topic}>0.5}$, $1_{P_{keyphrase}>0.5}$, $1_{P_{sentiment}>0.5}$, $1_{P_{words}>0.5}$ are indicator functions of the task type, the topic type, the key phrase type, the sentiment type, and the generated length type, respectively. A type of prompt word is only used when the random sampling probability thereof is greater than 0.5. For the $i^{th}$ character that needs to be generated, its condition depends on a preceding character $x_{<i}$ in the text and the 5 types of prompt words.

Step 211, intercepting a sample prefix text fragment from the sample natural language text.

In the present embodiment, the executing body may intercept the sample prefix text fragment from the sample natural language text. For example, a sample prefix text fragment consisting of the first 5 words may be intercepted from the sample natural language text. In special cases, the prefix text fragment may be empty.

Step 212, splicing the selected prompt words with the sample prefix text fragment to generate the sample input data.

In the present embodiment, the executing body may splice the selected prompt words with the sample prefix text fragment to generate the sample input data. For example, all of the 5 types of prompt words may be inserted in front of the sample prefix text fragment to obtain the sample input data. In practice, in order for the model to accurately distinguish between different types of prompt words, each type of prompt word may start with a special split start character, and correspondingly, end with a special split end character. For example, <t>, <k>, <s>, and <w> are the special split start characters of the topic type, the key phrase type, the sentiment type, and the generated length type of prompts, respectively, and </t>, </k>, </s>, and </w> are the special split end characters of the topic type, the key phrase type, the sentiment type, and the generated length type of prompts, respectively.

Step 213, inputting the sample input data into the initial language model to obtain sample pseudo-natural language text.

In the present embodiment, the executing body may input the sample input data into the initial language model to obtain the sample pseudo-natural language text.

Typically, through the prompt words in the sample input data, the model may be guided to generate relevant text.

Step 214, adjusting parameters of the initial language model, based on a difference between the sample pseudo-natural language text and the sample natural language text, to obtain the pre-trained language model.

In the present embodiment, the executing body may adjust the parameters of the initial language model, based on the difference between the sample pseudo-natural language text and the sample natural language text, to obtain the pre-trained language model.

Typically, by adjusting the parameters, a distribution of the sample pseudo-natural language text output by the pre-trained language model is closer to the distribution of the input sample natural language text. The closer the distribution of the sample pseudo-natural language text is to that of the sample natural language text, the higher the quality of the sample pseudo-natural language text, and the better the performance of the pre-trained language model.

As can be seen from FIG. 2, compared with the embodiment corresponding to FIG. 1, the flow 200 of the method for pre-training a model in the present embodiment highlights the prompt word generation step, the sample input data generation step, and the model training step. Therefore, the solution described in the present embodiment builds 5 types of prompt words, including the task type, the topic type, the key phrase type, the sentiment type and the generated length type, which may enable the model to better complete text generation for specified tasks, topics, styles, etc., greatly enriching users' control over text generation. Moreover, the solution may be used as a means of data enhancement to generate data in specific fields. In addition, the prompt words of the task type adopt the implementation of consecutive prompt words. Compared with discrete prompt words, the consecutive prompt words have stronger generality and enable the model to learn more effective representations, and avoid an impact and cost of manual selection of discrete prompt words on text generation. In the training phase, random sampling decides whether to use a certain type of prompt word, avoiding the strong dependence of the model on the prompt word during text generation. In the prediction phase, a user may choose whether to use a certain type of prompt word in more variety. The parameters are adjusted based on the difference between the sample pseudo-natural language text and the sample natural language text, so that the distribution of the sample pseudo-natural language text output by the pre-trained language model is closer to the input sample natural language text, improving the performance of the pre-trained language model.

Figure 3:
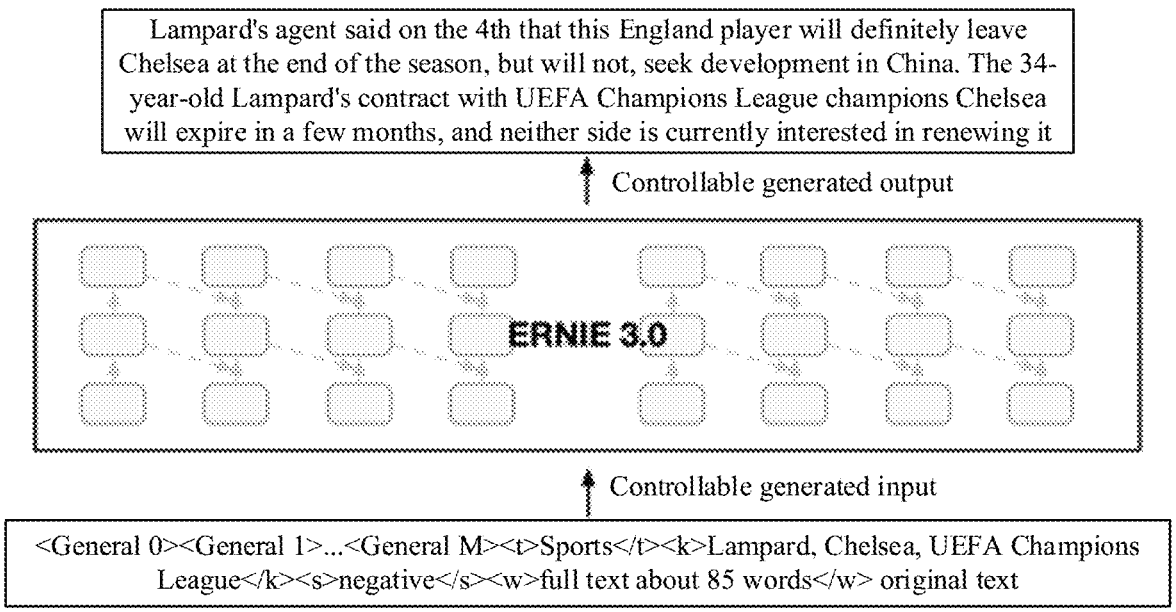
FIG. 3 is a scene diagram in which the method for pre-training a model according to embodiments of the present disclosure may be implemented.

For ease of understanding, FIG. 3 shows a scene diagram in which the method for pre-training a model according to embodiments of the present disclosure may be implemented. As shown in FIG. 3, content of the sample natural language text is analyzed, and the prompt words of the task type are determined as: <General 0><General 1> . . . <General M>, where M is an integer number between 0-63; the prompt word of the topic type is: sports; the prompt words of the key phrase type are: Lampard, Chelsea, UEFA Champions League; the prompt word of the sentiment type is: negative; the prompt word of the generated length type is: full text about 85 words. The above 5 types of prompt words are inserted in front of an original text of the sample natural language text to obtain the sample input data: <General 0><General 1> . . . <General M><t>Sports</t><k>Lampard, Chelsea, UEFA Champions League</k><s>negative</s><w>full text about 85 words</w>original text. Then, the sample input data is input into ERNIE 3.0, and the sample pseudo-natural language text is output: Lampard's agent said on the 4th that this England player will definitely leave Chelsea at the end of the season, but will not, seek development in China. The 34-year-old Lampard's contract with UEFA Champions League champions Chelsea will expire in a few months, and neither side is currently interested in renewing it. Based on a difference between the distribution of sample pseudo-natural language text and the distribution of the sample natural language text, the parameters of ERNIE 3.0 may be adjusted to obtain a pre-trained language model.

Figure 4:
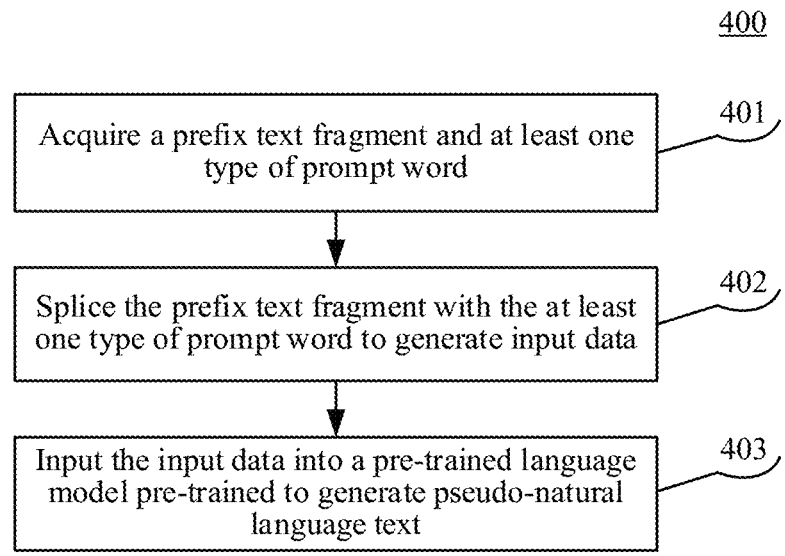
FIG. 4 is a flowchart of a method for generating text according to an embodiment of the present disclosure.

With further reference to FIG. 4, illustrating a flow 400 of a method for generating text according to an embodiment of the present disclosure. The method for generating text includes the following steps:

Step 401, acquiring a prefix text fragment and at least one type of prompt word.

In the present embodiment, an executing body of the method for generating text may acquire the prefix text fragment and the at least one type of prompt word.

The prefix text fragment may be any incomplete text fragment. The at least one type of prompt word may be a prompt word input by a user based on generation requirements. The user may input one type of prompt word, or may input multiple types of prompt words. In the prediction phase, the user may choose whether to use a certain type of prompt word in more variety. Here, relevant complete natural language text needs to be generated based on the prefix text fragment and the at least one type of prompt word.

Step 402, splicing the prefix text fragment with the at least one type of prompt word to generate input data.

In the present embodiment, the executing body may splice the prefix text fragment with the at least one type of prompt word to generate the input data. For example, the input data may be obtained by inserting all the prompt word input by the user in front of the prefix text fragment. In practice, in order for the model to accurately distinguish between different types of prompt words, each type of prompt word may start with a special split start character, and correspondingly, end with a special split end character.

Step 403, inputting the input data into a pre-trained language model pre-trained in advance to generate pseudo-natural language text.

In the present embodiment, the executing body may input the input data into the pre-trained language model pre-trained in advance to generate the pseudo-natural language text.

The pre-trained language model may be obtained by training using the embodiment of the method shown in FIG. 1 or FIG. 2. The pre-trained language model may be used to generate relevant complete pseudo-text based on the prefix text fragment and the at least one type of prompt word.

In the method for generating text provided by an embodiment of the present disclosure, by designing prompt word templates for different types of data in a pre-training phase, a language model can better generate text, which increases the controllability, interpretability and fun of the model. The user may guide the model to generate relevant text by inputting the at least one type of prompt word.

Figure 5:
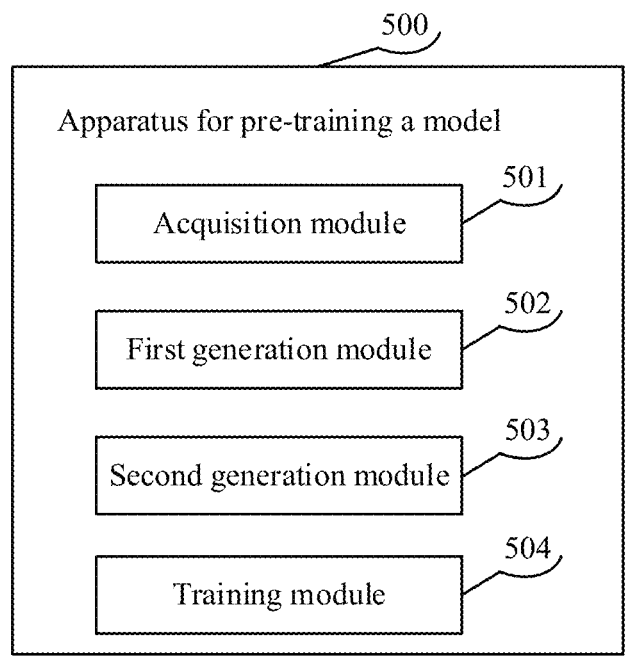
FIG. 5 is a schematic structural diagram of an apparatus for pre-training a model according to an embodiment of the present disclosure.

With further reference to FIG. 5, as an implementation of the method shown in the above figures, an embodiment of the present disclosure provides an apparatus for pre-training a model, which corresponds to the method embodiment shown in FIG. 1, and the apparatus may be applied to various electronic devices.

As shown in FIG. 5, an apparatus 500 for pre-training a model of the present embodiment may include: an acquisition module 501, a first generation module 502, a second generation module 503 and a training module 504. The acquisition module 501 is configured to acquire a sample natural language text. The first generation module 502 is configured to generate N types of prompt words based on the sample natural language text, where N is a positive integer. The second generation module 503 is configured to generate sample input data based on the sample natural language text and the N types of prompt words. The training module 504 is configured to train an initial language model based on the sample input data to obtain a pre-trained language model.

In the present embodiment, in the apparatus 500 for pre-training a model: for the detailed processing and the technical effects of the acquisition module 501, the first generation module 502, the second generation module 503 and the training module 504, reference may be made to the relevant descriptions of the steps 101-104 in the corresponding embodiment of FIG. 1 respectively, and detailed description thereof will be omitted.

In some alternative implementations of the present embodiment, the types of prompt words include a task type; and the first generation module 502 is further configured to: determine a target task type of the sample natural language text; acquire a vocabulary of consecutive prompt words associated with the target task type, where one task type is associated with one vocabulary of consecutive prompt words; and acquire consecutive prompt words of a random length from the vocabulary of consecutive prompt words associated with the target task type, as prompt words of the task type of the sample natural language text.

In some alternative implementations of the present embodiment, the types of prompt words include a topic type; and the first generation module 502 is further configured to: input the sample natural language text into a pre-trained topic classification model, to obtain a prompt word of the topic type of the sample natural language text.

In some alternative implementations of the present embodiment, the types of prompt words include a key phrase type; and the first generation module 502 is further configured to: input the sample natural language text into a pre-trained key phrase extraction model, to obtain a prompt word of the key phrase type of the sample natural language text.

In some alternative implementations of the present embodiment, the types of prompt words include a sentiment type; and the first generation module 502 is further configured to: input the sample natural language text into a pre-trained sentiment analysis model, to obtain a prompt word of the sentiment type of the sample natural language text.

In some alternative implementations of the present embodiment, the types of prompt words include a generated length type; and the first generation module 502 is further configured to: use a length of the sample natural language text as a prompt word of the generated length type of the sample natural language text.

In some alternative implementations of the present embodiment, the second generation module 503 is further configured to: generate random sampling probabilities of the N types of prompt words respectively; select, from the N types of prompt words, a prompt word whose random sampling probability is greater than a preset probability threshold; intercept a sample prefix text fragment from the sample natural language text; and splice the selected prompt word with the sample prefix text fragment to generate the sample input data.

In some alternative implementations of the present embodiment, the training module 504 is further configured to: input the sample input data into the initial language model, to obtain sample pseudo-natural language text; and adjust parameters of the initial language model based on a difference between the sample pseudo-natural language text and the sample natural language text, to obtain the pre-trained language model.

Figure 6:
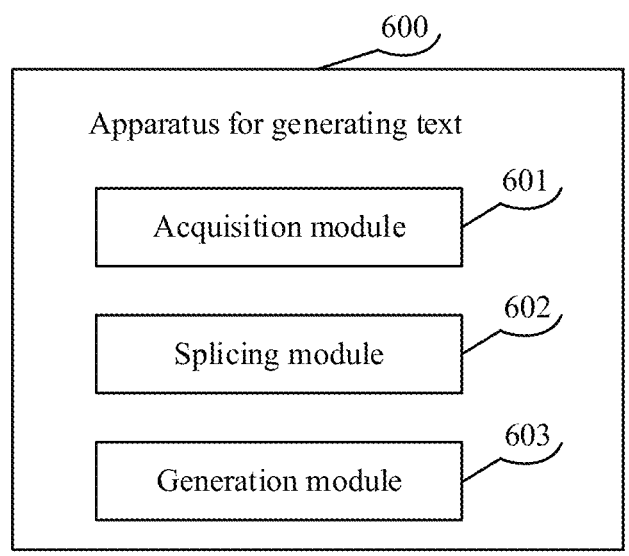
FIG. 6 is a schematic structural diagram of an apparatus for generating text according to an embodiment of the present disclosure.

With further reference to FIG. 6, as an implementation of the method shown in the above figures, an embodiment of the present disclosure provides an apparatus for generating text, which corresponds to the method embodiment shown in FIG. 4, and the apparatus may be applied to various electronic devices.

As shown in FIG. 6, an apparatus 600 for generating text of the present embodiment may include: an acquisition module 601, a splicing module 602 and a generation module 603. The acquisition module 601 is configured to acquire a prefix text fragment and at least one type of prompt word. The splicing module 602 is configured to splice the prefix text fragment with the at least one type of prompt word to generate input data. The generation module 603 is configured to input the input data into a pre-trained language model to generate pseudo-natural language text, where the pre-trained language model is obtained by training using the embodiment of the apparatus shown in FIG. 5.

In the present embodiment, in the apparatus 600 for generating text: for the detailed processing and the technical effects of the acquisition module 601, the splicing module 602 and the generation module 603, reference may be made to the relevant descriptions of the steps 401-403 in the corresponding embodiment of FIG. 4 respectively, and detailed description thereof will be omitted.

In the technical solution of the present disclosure, the collection, storage, use, processing, transmission, provision and disclosure of the user personal information involved are in compliance with relevant laws and regulations, and do not violate public order and good customs.

According to an embodiment of the present disclosure, an electronic device, a readable storage medium, and a computer program product are provided.

Figure 7:
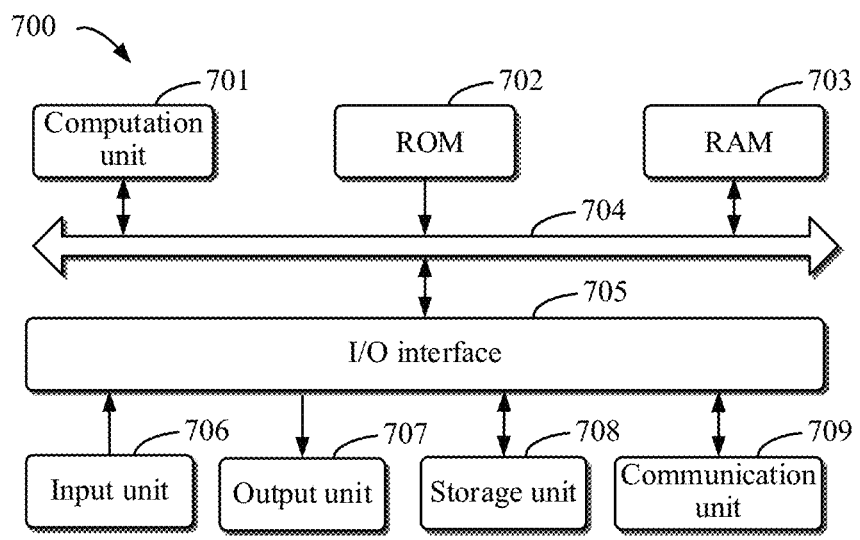
FIG. 7 is a block diagram of an electronic device used to implement the method for pre-training a model or the method for generating text according to embodiments of the present disclosure.

FIG. 7 illustrates a schematic block diagram of an example electronic device 700 that may be used to implement embodiments of the present disclosure. The electronic device is intended to represent various forms of digital computers, such as laptop computers, desktop computers, workbenches, personal digital assistants, servers, blade servers, mainframe computers, and other suitable computers. The electronic device may also represent various forms of mobile apparatuses, such as personal digital processors, cellular phones, smart phones, wearable devices, and other similar computing apparatuses. The components shown herein, their connections and relationships, and their functions are merely examples, and are not intended to limit the implementation of the present disclosure described and/or claimed herein.

As shown in FIG. 7, the device 700 includes a computation unit 701, which may perform various appropriate actions and processing, based on a computer program stored in a read-only memory (ROM) 702 or a computer program loaded from a storage unit 708 into a random access memory (RAM) 703. In the RAM 703, various programs and data required for the operation of the device 700 may also be stored. The computation unit 701, the ROM 702, and the RAM 703 are connected to each other through a bus 704. An input/output (I/O) interface 705 is also connected to the bus 704.

A plurality of parts in the device 700 are connected to the I/O interface 705, including: an input unit 706, for example, a keyboard and a mouse; an output unit 707, for example, various types of displays and speakers; the storage unit 708, for example, a disk and an optical disk; and a communication unit 709, for example, a network card, a modem, or a wireless communication transceiver. The communication unit 709 allows the device 700 to exchange information/data with other devices over a computer network such as the Internet and/or various telecommunication networks.

The computation unit 701 may be various general-purpose and/or dedicated processing components having processing and computing capabilities. Some examples of the computation unit 701 include, but are not limited to, central processing unit (CPU), graphics processing unit (GPU), various dedicated artificial intelligence (AI) computing chips, various computation units running machine learning model algorithms, digital signal processors (DSP), and any appropriate processors, controllers, microcontrollers, etc. The computation unit 701 performs the various methods and processes described above, such as a method for pre-training a model or a method for generating text. For example, in some embodiments, the method for pre-training a model or the method for generating text may be implemented as a computer software program, which is tangibly included in a machine readable medium, such as the storage unit 708. In some embodiments, part or all of the computer program may be loaded and/or installed on the device 700 via the ROM 702 and/or the communication unit 709. When the computer program is loaded into the RAM 703 and executed by the computation unit 701, one or more steps of the method for pre-training a model or the method for generating text described above may be performed. Alternatively, in other embodiments, the computation unit 701 may be configured to perform the method for pre-training a model or the method for generating text by any other appropriate means (for example, by means of firmware).

Various embodiments of the systems and technologies described above herein may be implemented in digital electronic circuit systems, integrated circuit systems, field programmable gate arrays (FPGA), application specific integrated circuits (ASIC), application specific standard products (ASSP), system on chip (SOC), load programmable logic devices (CPLD), computer hardware, firmware, software, and/or combinations thereof. These various embodiments may be implemented in one or more computer programs that may be executed and/or interpreted on a programmable system including at least one programmable processor, which may be a dedicated or general programmable processor that may receive data and instructions from a storage system, at least one input device, and at least one output device, and transmit data and instructions to the storage system, the at least one input device, and the at least one output device.

The program code for implementing the methods of the present disclosure may be written in any combination of one or more programming languages. These program codes can be provided to the processor or controller of general computer, dedicated computer or other programmable data processing device, so that when executed by the processor or controller, the program code enables the functions/operations specified in the flow chart and/or block diagram to be implemented. The program code can be executed completely on the machine, partially on the machine, partially on the machine and partially on the remote machine as a separate software package, or completely on the remote machine or server.

In the context of the present disclosure, a machine readable medium may be a tangible medium which may contain or store a program for use by, or used in combination with, an instruction execution system, apparatus or device. The machine readable medium may be a machine readable signal medium or a machine readable storage medium. The computer readable medium may include, but is not limited to, electronic, magnetic, optical, electromagnetic, infrared, or semiconductor systems, apparatuses, or devices, or any appropriate combination of the above. A more specific example of the machine readable storage medium will include an electrical connection based on one or more pieces of wire, a portable computer disk, a hard disk, a random access memory (RAM), a read only memory (ROM), an erasable programmable read only memory (EPROM or flash memory), an optical fiber, a portable compact disk read only memory (CD-ROM), an optical storage device, a magnetic storage device, or any appropriate combination of the above.

To provide interaction with a user, the systems and technologies described herein may be implemented on a computer that is provided with: a display apparatus (e.g., a CRT (cathode ray tube) or an LCD (liquid crystal display) monitor) configured to display information to the user; and a keyboard and a pointing apparatus (e.g., a mouse or a trackball) by which the user can provide an input to the computer. Other kinds of apparatuses may also be configured to provide interaction with the user. For example, feedback provided to the user may be any form of sensory feedback (e.g., visual feedback, auditory feedback, or tactile feedback); and an input may be received from the user in any form (including an acoustic input, a voice input, or a tactile input).

The systems and technologies described herein may be implemented in a computing system that includes a back-end component (e.g., as a data server), or a computing system that includes a middleware component (e.g., an application server), or a computing system that includes a front-end component (e.g., a user computer with a graphical user interface or a web browser through which the user can interact with an implementation of the systems and technologies described herein), or a computing system that includes any combination of such a back-end component, such a middleware component, or such a front-end component. The components of the system may be interconnected by digital data communication (e.g., a communication network) in any form or medium. Examples of the communication network include: a local area network (LAN), a wide area network (WAN), and the Internet.

The computer system may include a client and a server. The client and the server are generally remote from each other, and generally interact with each other through a communication network. The relationship between the client and the server is generated by virtue of computer programs that run on corresponding computers and have a client-server relationship with each other. The server may also be a distributed system server or a blockchain server.

It should be understood that the various forms of processes shown above may be used to reorder, add, or delete steps. For example, the steps disclosed in embodiments of the present disclosure may be executed in parallel, sequentially, or in different orders, as long as the desired results of the technical solutions mentioned in embodiments of the present disclosure can be implemented. This is not limited herein.

The above specific implementations do not constitute any limitation to the scope of protection of the present disclosure. It should be understood by those skilled in the art that various modifications, combinations, sub-combinations, and replacements may be made according to the design requirements and other factors. Any modification, equivalent replacement, improvement, and the like made within the principle of the present disclosure should be encompassed within the scope of protection of the present disclosure.

What is claimed is:

1. A method for pre-training a model, the method comprising:
    acquiring a sample natural language text;
    generating N types of prompt words based on the sample natural language text, wherein N is a positive integer, and the N types comprise at least one of a task type, a topic type, a key phrase type, or a sentiment type;
    generating sample input data based on the sample natural language text and the N types of prompt words; and
    training an initial language model based on the sample input data, to obtain a pre-trained language model,
    wherein the generating sample input data based on the sample natural language text and the N types of prompt words, comprises:
    generating random sampling probabilities of the N types of prompt words respectively;
    selecting, from the N types of prompt words, a prompt word whose random sampling probability is greater than a preset probability threshold;
    intercepting a sample prefix text fragment from the sample natural language text; and splicing the selected prompt word with the sample prefix text fragment to generate the sample input data.

2. The method according to claim 1, wherein the types of prompt words comprise the task type; and the generating N types of prompt words based on the sample natural language text, comprises:

determining a target task type of the sample natural language text;

acquiring a vocabulary of consecutive prompt words associated with the target task type, wherein one task type is associated with one vocabulary of consecutive prompt words; and acquiring consecutive prompt words of a random length from the vocabulary of consecutive prompt words associated with the target task type, as prompt words of the task type of the sample natural language text.

3. The method according to claim 1, wherein the types of prompt words comprise the topic type; and the generating N types of prompt words based on the sample natural language text, comprises:

inputting the sample natural language text into a pre-trained topic classification model, to obtain a prompt word of the topic type of the sample natural language text.

4. The method according to claim 1, wherein the types of prompt words comprise the key phrase type; and the generating N types of prompt words based on the sample natural language text, comprises:

inputting the sample natural language text into a pre-trained key phrase extraction model, to obtain a prompt word of the key phrase type of the sample natural language text.

5. The method according to claim 1, wherein the types of prompt words comprise the sentiment type; and the generating N types of prompt words based on the sample natural language text, comprises:

inputting the sample natural language text into a pre-trained sentiment analysis model, to obtain a prompt word of the sentiment type of the sample natural language text.

6. The method according to claim 1, wherein the types of prompt words comprise a generated length type; and the generating N types of prompt words based on the sample natural language text, comprises:

using a length of the sample natural language text as a prompt word of the generated length type of the sample natural language text.

7. The method according to claim 1, wherein the N types comprise at least two of: the task type, the topic type, the key phrase type, or the sentiment type.

8. The method according to claim 1, wherein the training the initial language model based on the sample input data to obtain the pre-trained language model, comprises:

inputting the sample input data into the initial language model, to obtain sample pseudo-natural language text; and adjusting parameters of the initial language model based on a difference between the sample pseudo-natural language text and the sample natural language text, to obtain the pre-trained language model.

9. A method for generating text by using a pre-trained language model obtained by training using the method according to claim 1, the method comprising:

acquiring a prefix text fragment and at least one type of prompt word;

splicing the prefix text fragment with the at least one type of prompt word to generate input data; and inputting the input data into a pre-trained language model to generate pseudo-natural language text.

10. An electronic device, comprising:

at least one processor; and a memory communicatively connected to the at least one processor; wherein, the memory stores instructions executable by the at least one processor, and the instructions, when executed by the at least one processor, cause the at least one processor to perform operations, the operations comprising:

acquiring a sample natural language text;

generating N types of prompt words based on the sample natural language text, wherein N is a positive integer, and the N types comprise at least one of a task type, a topic type, a key phrase type, or a sentiment type;

generating sample input data based on the sample natural language text and the N types of prompt words; and training an initial language model based on the sample input data, to obtain a pre-trained language model, wherein the generating sample input data based on the sample natural language text and the N types of prompt words, comprises:

generating random sampling probabilities of the N types of prompt words respectively;

selecting, from the N types of prompt words, a prompt word whose random sampling probability is greater than a preset probability threshold;

intercepting a sample prefix text fragment from the sample natural language text; and splicing the selected prompt word with the sample prefix text fragment to generate the sample input data.

11. The electronic device according to claim 10, wherein the types of prompt words comprise the task type; and the generating N types of prompt words based on the sample natural language text, comprises:

determining a target task type of the sample natural language text;

acquiring a vocabulary of consecutive prompt words associated with the target task type, wherein one task type is associated with one vocabulary of consecutive prompt words; and acquiring consecutive prompt words of a random length from the vocabulary of consecutive prompt words associated with the target task type, as prompt words of the task type of the sample natural language text.

12. The electronic device according to claim 10, wherein the types of prompt words comprise the topic type; and the generating N types of prompt words based on the sample natural language text, comprises:

inputting the sample natural language text into a pre-trained topic classification model, to obtain a prompt word of the topic type of the sample natural language text.

13. The electronic device according to claim 10, wherein the types of prompt words comprise the key phrase type; and the generating N types of prompt words based on the sample natural language text, comprises:

inputting the sample natural language text into a pre-trained key phrase extraction model, to obtain a prompt word of the key phrase type of the sample natural language text.

14. The electronic device according to claim 10, wherein the types of prompt words comprise the sentiment type; and
the generating N types of prompt words based on the sample natural language text, comprises:
inputting the sample natural language text into a pre-trained sentiment analysis model, to obtain a prompt word of the sentiment type of the sample natural language text.

15. The electronic device according to claim 10, wherein the types of prompt words comprise a generated length type; and
the generating N types of prompt words based on the sample natural language text, comprises:
using a length of the sample natural language text as a prompt word of the generated length type of the sample natural language text.

16. The electronic device according to claim 10, wherein the generating sample input data based on the sample natural language text and the N types of prompt words, comprises:
generating random sampling probabilities of the N types of prompt words respectively;
selecting, from the N types of prompt words, a prompt word whose random sampling probability is greater than a preset probability threshold;
intercepting a sample prefix text fragment from the sample natural language text; and
splicing the selected prompt word with the sample prefix text fragment to generate the sample input data.

17. The electronic device according to claim 10, wherein the training the initial language model based on the sample input data to obtain the pre-trained language model, comprises:
inputting the sample input data into the initial language model, to obtain sample pseudo-natural language text; and
adjusting parameters of the initial language model based on a difference between the sample pseudo-natural language text and the sample natural language text, to obtain the pre-trained language model.

18. An electronic device for generating text, comprising:
at least one processor; and
a memory communicatively connected to the at least one processor; wherein,
the memory stores instructions executable by the at least one processor, and the instructions, when executed by the at least one processor, cause the at least one processor to perform the method according to claim 9.

19. A non-transitory computer readable storage medium, storing computer instructions thereon, wherein, the computer instructions, when executed by a computer, cause the computer to perform operations, the operations comprising:
acquiring a sample natural language text;
generating N types of prompt words based on the sample natural language text, wherein N is a positive integer;
generating sample input data based on the sample natural language text and the N types of prompt words, and the N types comprise at least one of a task type, a topic type, a key phrase type, or a sentiment type; and
training an initial language model based on the sample input data, to obtain a pre-trained language model,
wherein the generating sample input data based on the sample natural language text and the N types of prompt words, comprises:
generating random sampling probabilities of the N types of prompt words respectively;
selecting, from the N types of prompt words, a prompt word whose random sampling probability is greater than a preset probability threshold;
intercepting a sample prefix text fragment from the sample natural language text; and
splicing the selected prompt word with the sample prefix text fragment to generate the sample input data.

20. The computer readable storage medium according to claim 19, wherein the types of prompt words comprise the task type; and
the generating N types of prompt words based on the sample natural language text, comprises:
determining a target task type of the sample natural language text;
acquiring a vocabulary of consecutive prompt words associated with the target task type, wherein one task type is associated with one vocabulary of consecutive prompt words; and
acquiring consecutive prompt words of a random length from the vocabulary of consecutive prompt words associated with the target task type, as prompt words of the task type of the sample natural language text.

* * * * *